United States Patent [19]

van Duuren et al.

[11] 4,092,630

[45] May 30, 1978

[54] SYSTEM FOR ERROR CONTROL AND PHASING IN INTERCONNECTED ARQ-CIRCUITS

[75] Inventors: Hendrik Cornelis Anthony van Duuren, Wassenaar; Herman da Silva, Voorburg, both of Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 732,995

[22] Filed: Oct. 15, 1976

[30] Foreign Application Priority Data

Oct. 17, 1975 Netherlands ............ 7512209

[51] Int. Cl.² ........... G08C 25/00; H04L 1/10; G06F 11/00
[52] U.S. Cl. .......... 340/146.1 BA; 178/23 A; 178/58 A
[58] Field of Search ......... 340/146.1 BA, 146.1 D; 178/58 A; 325/5, 41; 178/23 A, 69 R, 69 L

[56] References Cited

U.S. PATENT DOCUMENTS

| | | |
|---|---|---|
| 3,641,494 | 2/1972 | Perrault et al. ........... 340/146.1 BA |
| 3,879,577 | 4/1975 | Progler ........... 340/146.1 BA X |
| 3,956,589 | 5/1976 | Weathers et al. ........... 178/58 A |

*Primary Examiner* — Jerry Smith
*Attorney, Agent, or Firm* — Hugh Adam Kirk

[57] ABSTRACT

A system for reducing the time for repeating erroneous signals through a series of interconnected ARQ-circuits (automatic error correction circuits), in which the durations of the repetition cycles of the ARQ-circuits, as compared to one another, are not equal. The system comprises means at a connection point and capable of storing a number of signals related to each propagation time of a circuit located before the connection point, when a circuit located behind the connection point goes through a repetition procedure including means for generating a special signal to indicate when a repetition procedure is in process in one of said ARQ interconnected circuits to prevent the other interconnected ARQ circuits from also going through their repetition procedures.

8 Claims, 4 Drawing Figures

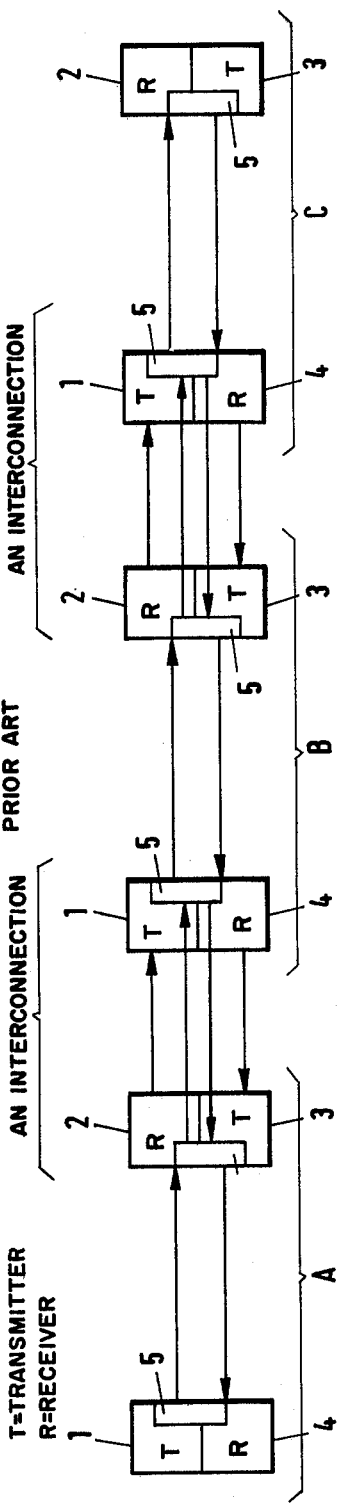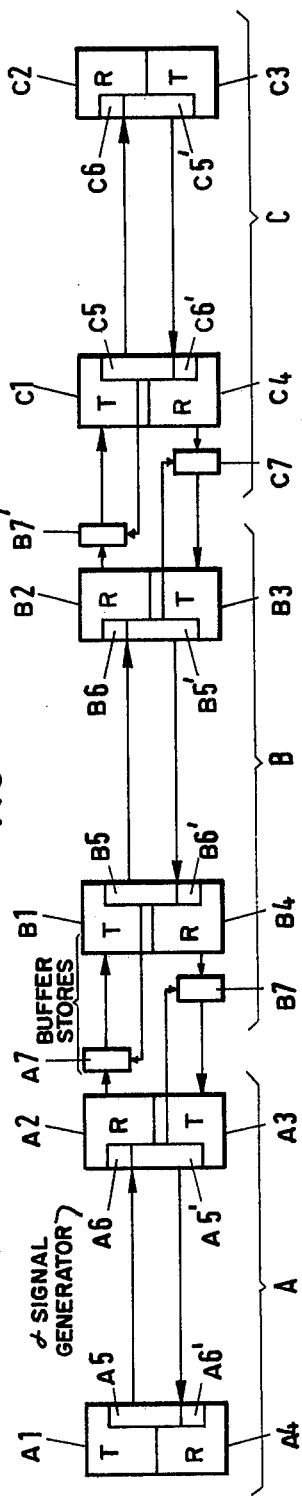

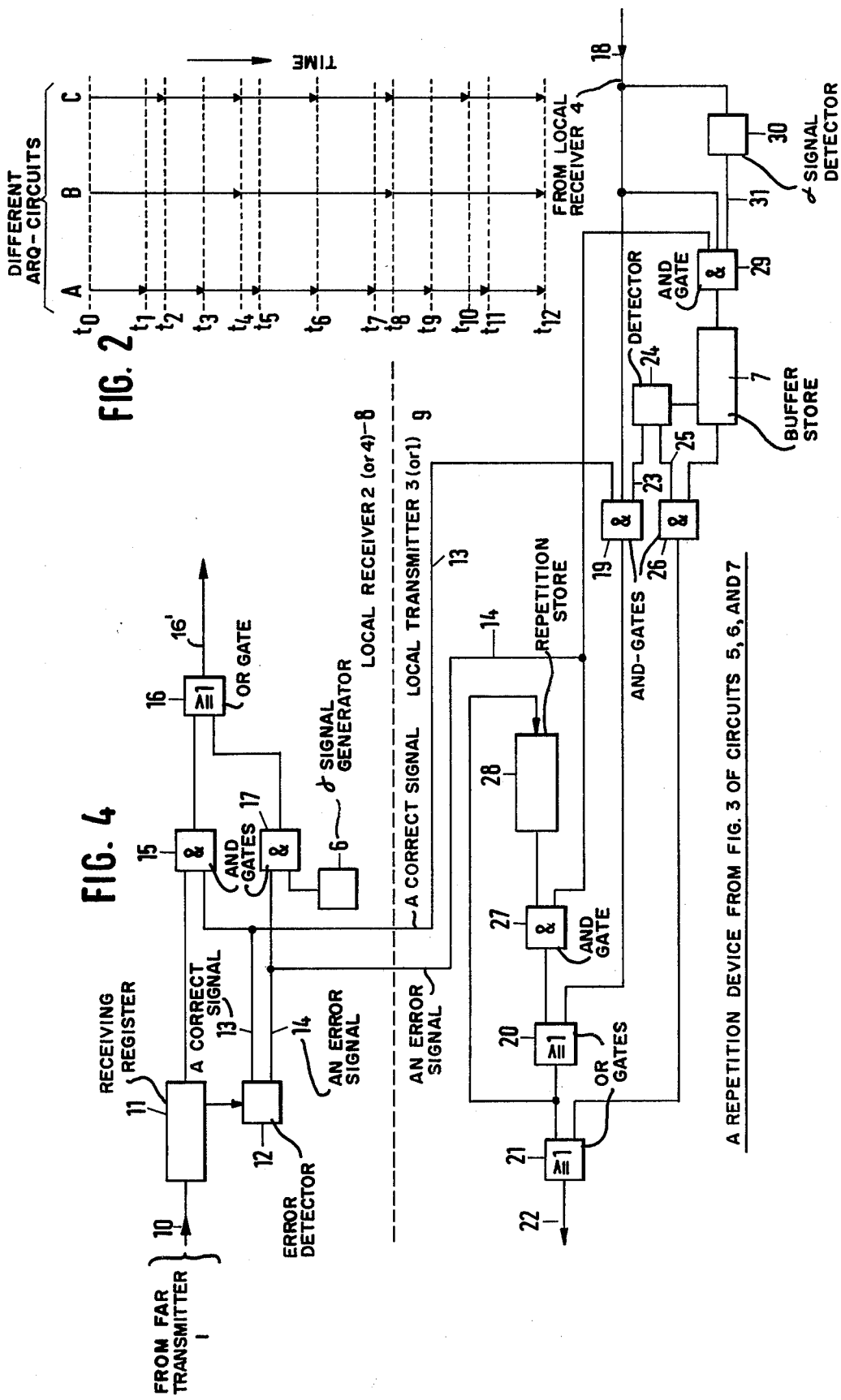

SYSTEM FOR ERROR CONTROL AND PHASING IN INTERCONNECTED ARQ-CIRCUITS

BACKGROUND OF THE INVENTION

The invention relates to a system for error control and phasing in interconnected ARQ-circuits, since the durations of the repetition cycles of the ARQ-circuits, as compared to one another, are not equal. As it is well known, an ARQ-circuit comprises a transmitter-receiver at each end of a transmission path, and that each transmitter comprises a repetition store in which some of the last-transmitted signals are recorded. If at the receiving end an error is ascertained among received signals reeived, then the transmitter at the receiving end transmits an RQ-signal or a request for repetition, whereupon the transmitter at the transmitting end transmits a specific signal to indicate that the signals will be repeated, after which the contents of the aforesaid repetition store are transmitted. It is a simple thing to realize that the duration of such a repetition procedure and the contents of the repetition store are dependent on the propagation time, and, among other things, on the length of the transmission path. Besides for error control a procedure of this kind can also be utilized for phasing. Therefore for the sake of efficiency it is desirable that the repetition time for a certain transmission path always has a fixed duration, which duration is related to the propagation time.

A problem arises when, in a telecommunication system, a number of ARQ-circuits having different repetition times are interconnected in series. When an error presents itself in an $n$ th circuit of such a system, the receiving end of this circuit will send back a request for repetition to the transmitting end. The transmitting end then repeats the last-transmitted signals, but during that time it cannot deal with traffic from the immediately preceding circuit, that is from a circuit from which information is offered to this transmitter. In order to prevent the information from the preceding circuit from getting lost, this preceding circuit is made to repeat as well; and the same occurs with all the other preceding circuits. Even in the circuits that follow, that are the circuits to which information is offered by the said circuit, a repetition procedure is initiated. In case the repetition cycles of the various circuits are not equal, it may take much time before all the ARQ-procedures end at the same instant.

SUMMARY OF THE INVENTION

The present invention offers a simple solution for the problem posed and is based on the understanding that there is a possibility that only the circuit in which an error has been detected goes through an ARQ-procedure. For that purpose the system according to the invention is characterized by means provided at a connection point that is capable of storing a number of signals related to the propagation time of a circuit located before the connection point, when a circuit located behind the connection point goes through a repetition procedure. Besides having a buffer store, the extent of said means can be limited by providing the receivers of a circuit with means for delivering special signals, not belonging to the traffic to a circuit that follows, during the time when the said circuit goes through a repetition procedure. On receipt of these special signals an original source of information can stop the delivery of signals belonging to the traffic. Thus the means provided at the connection point can comprise, in addition to the buffer store, a detector for special signals not belonging to the traffic, and a gate circuit for preventing the said special signals from being recorded in the buffer store; in consequence of this the contents of the buffer store are restricted. Also, the means provided at the connection point can comprise gate circuits and a detector for ascertaining if the buffer store is empty and thus ensure that signals can only pass the connection point after the contents of the buffer store have been transmitted. As a result other circuits than the circuit in which an error presents itself are prevented from repeating, which saves considerable time when retrieving an error or when phasing in a system of interconnected ARQ-circuits having repetition cycles of a different duration.

BRIEF DESCRIPTION OF THE VIEWS

The above mentioned and other features, objects and the advantages and a manner of attaining them are described more specifically below by reference to an embodiment of this invention shown in the accompanying drawings, wherein:

FIG. 1 is a block wiring diagram of a prior art system comprising a number of interconnected ARQ-circuits having repetition cycles of a different duration, in which the invention has not been applied;

FIG. 2 is a time diagram of the course of repetition cycles of the prior art series system according to FIG. 1;

FIG. 3 is a block wiring diagram of a system according to the invention adapted to a series of interconnected ARQ-circuits having repetition cycles of a different duration as shown in FIG. 1; and FIG. 4 is a detailed block wiring diagram of one embodiment of one of the repetition devices and its connected circuits according to the present invention provided at the connection points of different ARQ-circuits connected in series as shown in FIG. 3.

DETAILED DESCRIPTION OF A PREFERRED EMBODIMENT

Prior Art Series System

FIG. 1 represents a system with three interconnected ARQ-circuits, A, B and C, each comprising a transmitter (T) 1 and a receiver (R) 2 for the direction of traffic ABC, and a transmitter (T) 3 and a receiver (R) 4 for the direction of traffic CBA. Each transmitter-receiver (T-R) 1,4 and 3,2 is provided with a repetition device 5.

A system of this kind can be utilized for simplex traffic as well as for duplex traffic.

The repetition device 5 checks the incoming signals for errors by means, of e.g. a parity check. When an error has been ascertained, the device 5 transmits an RQ-signal to the receiver (R) in the same circuit, whereupon the transmitter (T) belonging to the said receiver (R) again transmits the last-transmitted signals, preceded by a specific signal, from a repetition store in the repetition device 5. In this case the number of signals in the repetition store of the repetition device 5 is in proportion to the propagation time in the relevant ARQ-circuit; besides the repetition store always comprises a fixed whole number of signals.

It is also known to utilize such an ARQ-procedure for phasing, in which case the receiving end excepts an unambiguous signal, the repetition of which it asks for until it is received unmutilated, which means that the phasing of the receiver has been effected. The erroneous signals received by the receiver and the subsequent signals are not delivered to the equipment that follows; only the signals received after repetition and found correct by the receiver are passed on again.

It is well known in a system of interconnected ARQ-circuits, that as soon as signals have been received in error, mutilated signals are deliberately passed on to an ARQ-circuit that follows, thus causing the circuits that follow to start repeating as well. When e.g. in circuit A the receiver 2 receives an erroneous signal, the transmitter 3 transmits an RQ-signal to the receiver 4, after which the last-transmitted signals are transmitted once again by the repetiton device 5 via the transmitter 1. During this ARQ-procedure the receiver 4 of circuit B (B4) cannot deliver signals to the transmitter 3 of circuit A (A3), because the transmitter A3 co-operates in the ARQ-procedure. Hence the receiver B4 causes the transmitter B1 to transmit an RQ-signal, as a result of which circuit B starts repeating as well. The same occurs in circuit C. Each ARQ-procedure of each of the circuits comprises a fixed number of signals dependent on the propagation time and on the signal frequency.

If a series of ARQ-circuits with widely different durations of ARQ-procedures are interconnected, all the ARQ-circuits continue to go through a repetition procedure till they all end at the same moment, because each ARQ-procedure comprises a fixed whole number of signals per circuit.

FIG. 2 represents a time diagram in which the durations of the ARQ-procedures of the circuits A, B and C are in the ratio of 3 to 8 to 4. If in circuit A an ARQ-procedure is started at the moment $t_o$, then ARQ-procedures will also be started in B and C as has been described in the above. For the sake of simplicity, the initial instants of each of the three ARQ-procedures have been put on one line in FIG. 2. At the moment $t_1$ the ARQ-procedures comes to an end in circuit A, but it goes on in the circuits B and C, in consequence of which a fresh ARQ-procedure starts in circuit A. Situations of the same kind present themselves at the moments $t_2$ to $t_{11}$. The circuits A, B and C do not simultaneously end their repetition cycles until the moment $t_{12}$, after which the normal traffic can proceed. From FIG. 2 it appears that in this example one single error in circuit A can hold up the traffic during eight repetition cycles.

THE INVENTION

According to the invention, however, an error in one circuit results in a retardation of traffic of only one repetition cycle. FIG. 3 shows an example of a system according to the invention. In this FIG. 3, 1 and 3 represent again transmitters (T), 4 and 2 receivers (R) and 5 the repetition devices, which, according to the invention, comprise a generator 6 for the so-called α-signals. An α-signal is a special signal not belonging to the traffic.

Moreover, according to the invention, there are two buffer stores 7 provided at a connection point. The capacity of the buffer stores 7 is at least equal to that of the repetition stores of the preceding circuit. So the contents of the buffer store A7 between the receiver A2 and the transmitter B1 is at least equal to that of the repetition store in the repetition device A5 of the transmitter A1. If e.g. in circuit B an error presents itself, which is ascertained by the receiver B2, the transmitter B3 transmits an RQ-signal to the receiver B4, after which the transmitter B1 starts repeating. At the same time the generator B6 in the receiver B2 starts delivering α-signals to the transmitter C1, which, when received in the receiver C2, interrupt the supply of signals to the transmitter C3. The transmitter C3 transmits α-signals to the receiver C4. The signals received by the receiver C4 after the transmitter B3 was occupied because of the repetition procedure and before the α-signals had been received again by the receiver C4, are recorded, at the command of the transmitter-receiver B2, B3, in the buffer store C7 between the receiver C4 and the transmitter B3. The α-signals are not recorded in the buffer store C7. Likewise the receiver B4 transmits α-signals to the circuit A. The signals received in the receiver A2 after the beginning of the ARQ-procedure are recorded in the buffer store A7 between the receiver A2 and the transmitter B1. Immediately after the ARQ-procedure has come to an end, the contents of the buffer store 7 are transmitted by the transmitters that follow, after which the normal traffic then can proceed. The same occurs in case of loss of synchronization between the transmitter (T) and the receiver (R) in a circuit.

FIG. 4 shows a preferred embodiment of the repetition device 5 with the generator 6, the buffer store 7 and the means for controlling the buffer store 7. In this FIG. 4, the buffer store 7 is drawn in the transmitter 3 of the channel intended for the opposite direction of transmission. Part 8 of the circuit diagram relates to the receivers 2 and 4, and part 9 to the transmitters 3 and 1, respectively. Via an input 10 the signals of e.g. a remote or far transmitter 1 (FIG. 3) enter a receiving register 11 of a local receiver 2. An error detector circuit 12 checks the parity in the signal and in the case of a correctly received signal it applies a signal to a conductor 3 and in the case of an incorrectly received signal of correct reception a signal to a conductor 14. A signal at the conductor 13 keeps an AND-gate 15 open, after which the signal leaves the receiver 2 via an OR-gate 16. A signal of an error at the conductor 14 keeps an AND-gate 17 open, in consequence of which α-signals from the generator 6 are led to the output 16'.

A signal coming from a local receiver 4 and entering the circuit 9 via an input 18 is led to an ouptut 22 via the AND-gate 19 and the OR-gates 20 and 21, when a conductor 23 of a detector 24 and the conductor 13 carry a signal. The detector 24 applies a signal to the conductor 23, when the buffer store 7 is empty. A conductor 25 carries a signal, when the buffer store 7 is not empty, so that an AND-gate 26 can transmit the contents of the buffer store 7 to a local transmitter 3 via the OR-gate 21. During an ARQ-procedure a signal of an error at the conductor 14 ensures that the contents of a repetition store 28 can be led to the output 22 via an AND-gate 27. At the same time this signal ensures that the signals arriving via the input 18 can be recorded in the buffer store 7 via an AND-gate 29. α-Signals are not recorded in the buffer store 7. For this purpose the circuit has been provided with an α-signal-detector 30, which only applies a signal to a conductor 31 when signals different from α-signals arrive at the input 18. If now the circuit, to which the circuits 8 and 9 belong, starts repeating because of the fact that the repetition circuit 12 detects an error, then the conductor 14 receives a signal, which causes the generator 6 to start transmitting α-signals via the OR-gate 16. The signals entering via the input 18 are recorded, as indicated above, in the buffer store 7. As soon as the ARQ-procedure has come to an end, the signal at 14 no longer occurs, so that the contents of the buffer store 7 are transmitted via the AND-gate 26. As soon as the buffer store 7 is empty, the detector 24 applies a signal to the conductor 23, so that each signal then entering via the input 18 is led to the output 22 via the AND-gate 19 and the OR-gates 20 and 21. Even α-signals, if any, which still enter via the input 18, are transmitted again now. In practice usually fresh signals will enter the input 18 just after the buffer store 7 is empty.

With the system according to the invention it is attained that in a system comprising ARQ-circuits each repetition lasts as long as the ARQ-cycle of the circuit in which an error presents itself. This is all the more important when the durations of the ARQ-cycles are widely different, as it may be the case with a connection of national, international and intercontinential circuits.

It is to be understood that the invention does not restrict itself to the connection of only three ARQ-circuits, and that the field of application of this invention is not limited to teleprinting over radio circuits or data transmission; but also to include the circuits of a switching plant.

What we claim is:

1. System for error control and phasing in a series of interconnected ARQ-circuits; the durations of the repetition cycles of each ARQ-circuits, as compared to one another, being not equal, said system comprising: means provided at a connection point capable of storing a number of signals related to the propagation time of a circuit located before the connection point, when a circuit located behind the connection point goes through a repetition procedure; and means to deliver special signals not belonging to the traffic to the circuits located behind the connection point and not going through a repetition procedure to prevent their repetition when the first said circuit behind said connection point goes through a repetition procedure.

2. System according to claim 1, wherein said means provided at the connection point comprises a buffer store (7), a first detector (30) for detecting signals not belonging to the traffic, and a gate circuit (29) between said buffer store and said detector for controlling said buffer store to prevent recording of the said special signals in the buffer store (7).

3. System according to claim 2 wherein said means provided at the connection point comprises a second detector (24) connected to said buffer store, and gate circuits (19, 20, 21 and 26) controlled by said detector for controlling the transmitting the signals recorded in the buffer store (7), when the circuit that follows is no longer in a repetition procedure.

4. In a system of a series of interconnecting automatic error correction telecommunication traffic signal circuits, at least one of which circuits has a different repetition cycle time than that of the other circuits, means at each connection between said circuits for automatically correcting an error in any one of said circuits by delaying the other circuits only for the time it takes for correcting said error in said one circuit, said means comprising:
(A) means for detecting errors in the traffic signals of each circuit,
(B) means for storing traffic signals,
(C) means for generating a special signal in response to said error detecting means for transmission over said other circuits until said error is corrected,
(D) means for detecting said special signal, and
(E) means controlled by said special signal detecting means for preventing the further transmission of traffic signals while said special signals are being detected.

5. A system according to claim 4 wherein said means for detecting errors comprises a parity checking circuit.

6. A system according to claim 4 wherein said means for storing traffic signals includes a buffer store.

7. A system according to claim 4 wherein said means at each connection is in each direction path at each connection.

8. A system according to claim 4 wherein said means for preventing transmission of traffic includes gate means.

* * * * *

UNITED STATES PATENT AND TRADEMARK OFFICE
CERTIFICATE OF CORRECTION

PATENT NO. : 4,092,630
DATED : May 30, 1978
INVENTOR(S) : Hendrik C. A. van Duuren et al It is certified that error appears in the above-identified patent and that said Letters Patent are hereby corrected as shown below:

In the Abstract, line 6, cancel "and"; line 7, change "each" to - - the - -.
Column 1, line 14, cancel "re-"; line 15, change "ceived," to - - the - - and change "reeived" to - - received - - . Column 2, line 25, change "number" to - - series - -; line 65, change "excepts" to - - expects - -.
Column 3, line 37, change "procedures" to - - procedure - -.
Column 4, line 18, change "store" to - - stores - -; line 34, change "3" to - - 13 - -; line 35, cancel "of correct"; line 36, cancel "reception" and after "signal" (second occurrence) insert - - of correct reception - -; line 50, change "transmitter" to - - receiver - -.
Column 5, line 16, change "intercontinential" to - - intercontinental - -.

Signed and Sealed this

Twenty-first Day of November 1978

[SEAL]

Attest:

RUTH C. MASON
Attesting Officer

DONALD W. BANNER
Commissioner of Patents and Trademarks